Figure 7:
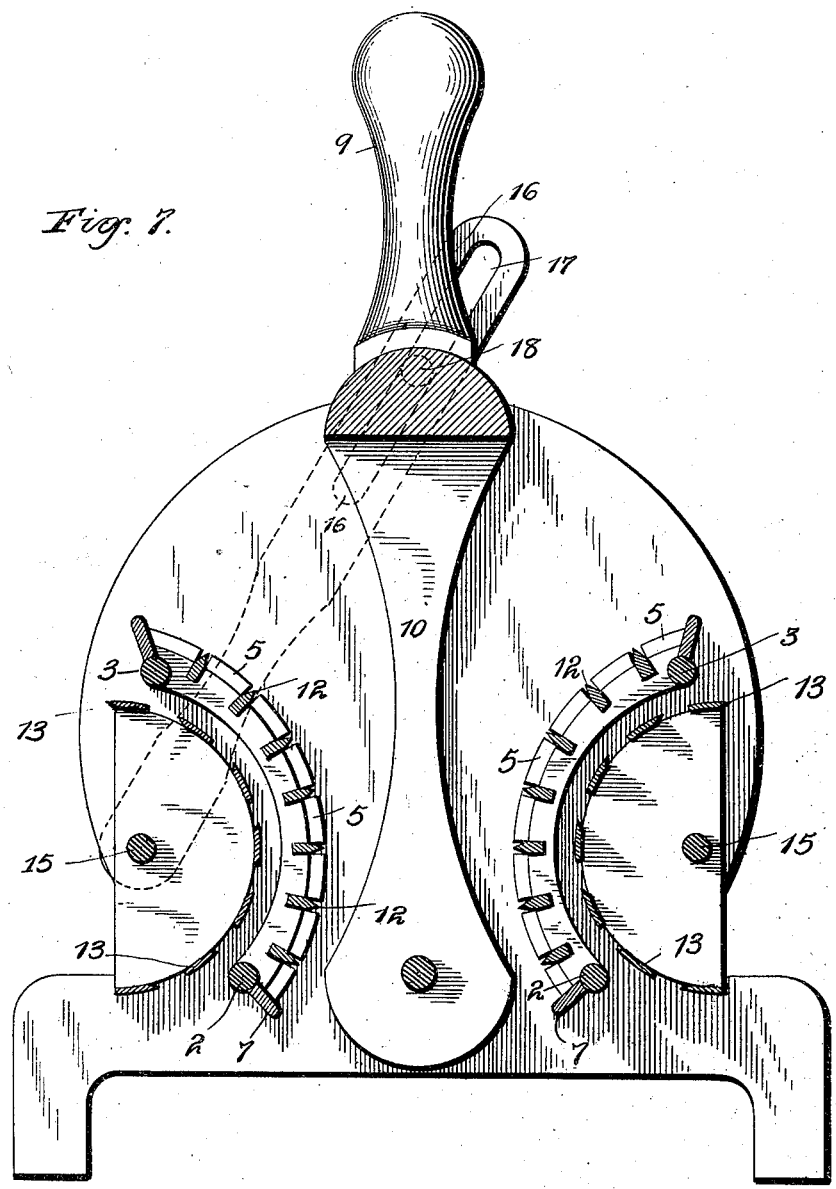

No. 643,106. Patented Feb. 13, 1900.
J. BLONDE.
FRUIT OR VEGETABLE CUTTER.
(Application filed Apr. 20, 1899.)
(No Model.) 3 Sheets—Sheet 1.
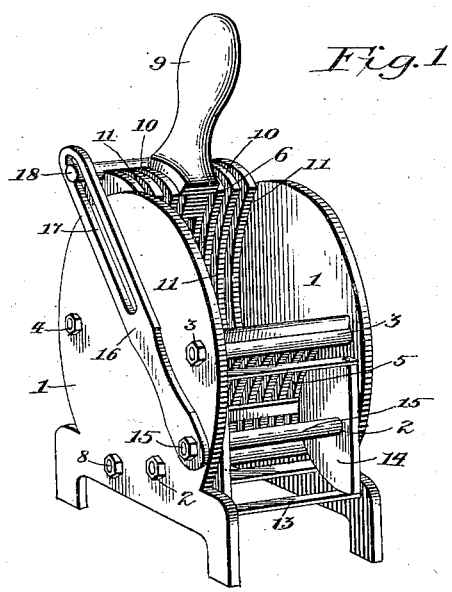
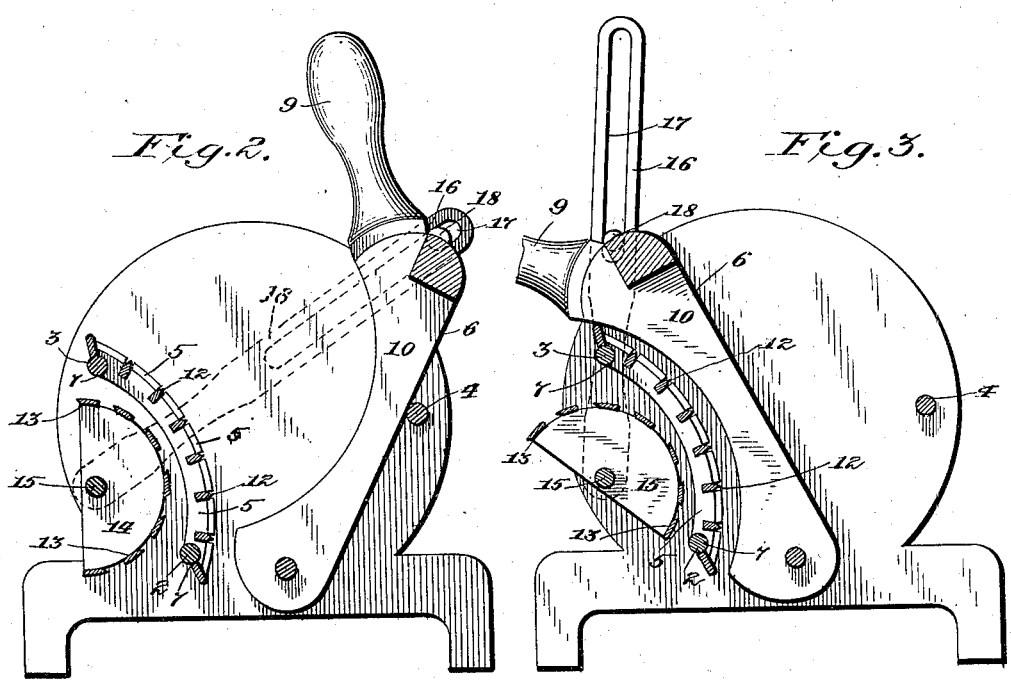
WITNESSES
INVENTOR
Joseph Blonde
By Victor J. Evans.
Attorney
THE NORRIS PETERS CO., PHOTO-LITHO., WASHINGTON, D. C.

No. 643,106. Patented Feb. 13, 1900.
J. BLONDE.
FRUIT OR VEGETABLE CUTTER.
(Application filed Apr. 20, 1899.)
(No Model.) 3 Sheets—Sheet 2.
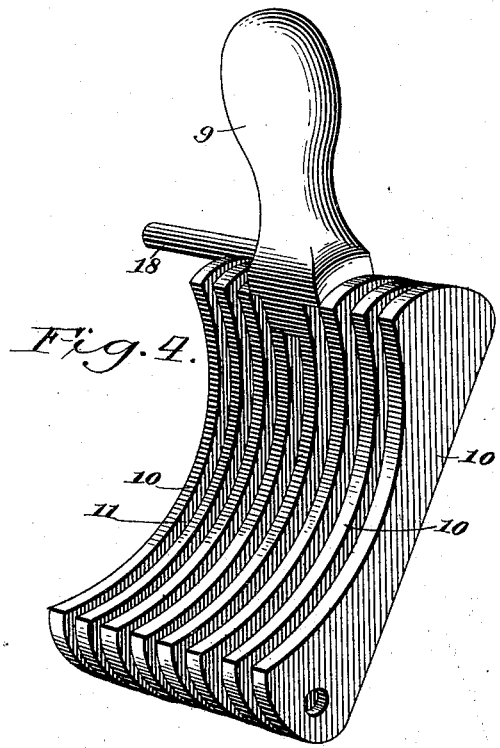
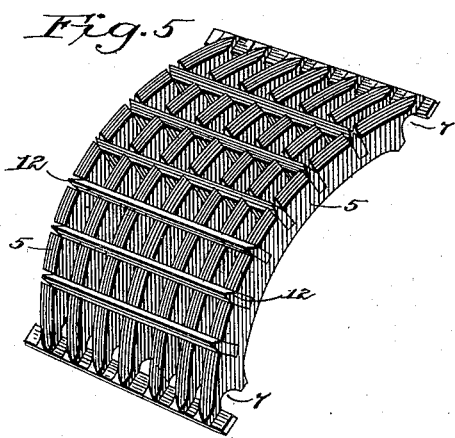
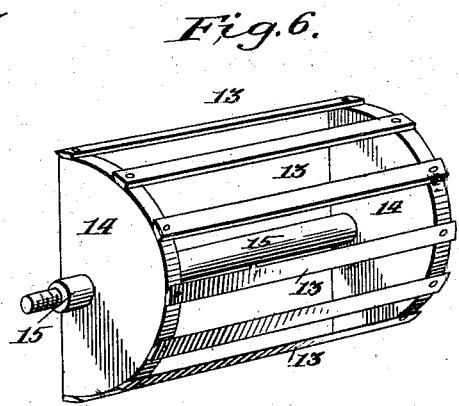
WITNESSES
A. B. Digges
L. D. Heinrichs
INVENTOR
Joseph Blonde
By Victor J. Evans.
Attorney No. 643,106. Patented Feb. 13, 1900.
J. BLONDE.
FRUIT OR VEGETABLE CUTTER.
(Application filed Apr. 20, 1899.)
(No Model.) 3 Sheets—Sheet 3.

WITNESSES
S. E. Stanford.
Chas. S. Hyer.

INVENTOR
Joseph Blonde
By Victor J. Evans
Attorney

UNITED STATES PATENT OFFICE.

JOSEPH BLONDE, OF LENOX DALE, MASSACHUSETTS.

FRUIT OR VEGETABLE CUTTER.

SPECIFICATION forming part of Letters Patent No. 643,106, dated February 13, 1900.

Application filed April 20, 1899. Serial No. 713,749. (No model.)

*To all whom it may concern:*

Be it known that I, JOSEPH BLONDE, a citizen of the United States, residing at Lenox Dale, in the county of Berkshire and State of Massachusetts, have invented certain new and useful Improvements in Fruit or Vegetable Cutters; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of the invention is to produce a fruit or vegetable cutter which can be readily and efficiently operated by hand and be adapted to cut the fruit or vegetables into slices or particles of varying size by virtue of a certain arrangement and operation of the cutting-knives.

It is also the object to have certain of the knives removable from their cutting positions, whereby to permit the operation of one set of knives when plain slicing is desired or the use of any two sets when desired to obtain certain results in cutting.

The novel features of the invention will be fully described hereinafter, and defined in the appended claims.

In the accompanying drawings, illustrating my invention, Figure 1 is a perspective view of the cutter constructed in accordance with the invention; Fig. 2, a view in side elevation showing one of the side frames removed to disclose the interior of the cutter and the movable parts thereof in their normal positions; Fig. 3, a view similar to Fig. 2, but showing the presser-frame thrown forward against the stationary knives; Fig. 4, a perspective view of the presser-frame; Fig. 5, a perspective view of the set of stationary knives; Fig. 6, a perspective view of the movable knives, and Fig. 7 a sectional view of a double form of the device.

Referring to the drawings, 1 indicates the side frames of the cutter, which are held together by the bolts 2, 3, and 4, so arranged as to form the means by which the stationary set of knives 5 and the presser-frame 6 are supported in operative position to each other, the bolts 2 and 3 permitting the stationary knives to lie in an oblique position, while bolt 4 supports the presser-frame at the limit of its rearward movement and forms a stop therefor.

The knives 5 of the stationary set are curved and connected together, as shown, thus presenting a convex inner cutting-face to the presser-frame 6, which is also curved to lie upon the same when brought forward, thereby insuring the pressing of the fruit or vegetables against the knives at all points. This connected set of knives is provided at each end thereof and on its under side with semicircular recesses 7 7 to receive the bolts 2 and 3, respectively, and hold the said set securely in position, while rendering it possible to readily remove the same when it is desired, as is desirable for the purposes of sharpening and cleaning the knives.

The presser-frame 6 is pivotally mounted at its lower end on the shaft 8, located at the lower end of the set of knives 5, and is operated back and forth after the manner of a jaw by means of the handle 9, centrally located at the upper end thereof. This presser-frame is composed of a series of bars 10, connected at their ends in such a manner as to form open spaces or slots 11 between said bars and of such size and so arranged with reference to knives 5 as to permit the said knives to enter the slots until engagement is effected with the bars 10, which seek to enter between the blades. By means of this arrangement of the bars and knives it will be seen that the product within the cutter is not only held so that complete cutting is insured, but is at the same time forced between the knives, the purposes of which are obvious.

A set of knives 12 are mounted upon the knives 5 in positions transverse to those of said knives 5 and so fitted within notches formed therein as to have their cutting edges lie slightly below the plane of the edge of those in which said transverse knives are mounted. These knives 12 are adapted to be removed, so that the fruit or vegetables may be merely sliced, if so desired.

For the purpose of rendering the fruit or vegetables in a more finely divided state than is produced by the cuttings above referred to and which may be said to be the principal aim of the present invention there is provided a third set of knives 13, supported in close proximity to the under side of the set 5 and on semicircular heads or frames 14, mounted upon the shaft 15. Movement of the said knives back and forth in the concavity or arch formed by the under side of the knives 5 is effected by means of the lever 16, rigidly mounted on the end of the shaft 15, outside the frame 1, through which the said shaft projects. This lever is provided with a slot 17, into which extends a laterally-projecting pin 18 or arm, permanently mounted on top of the presser-frame, thus carrying the said lever back and forth as the said presser-frame is operated. While the means for moving the knives 13 back and forth, as shown, is the automatic result of the movement of the presser-frame, it will be obvious that said operating-lever 16 may be so connected with the arm 18 of the presser-frame as to have a longitudinal movement and impart motion to the shaft 15 by means of a rack-and-pinion gearing, or other obvious means may be employed.

By the above-described arrangement of knives it will be seen that the fruit and vegetables first receive what may be termed a "vertical" cutting, then a similar cutting transverse to the lines of the initial cutting, and upon its emergence from the blades 5 and 12 a horizontal transverse cutting.

It will be obvious that the knives 13 may be arranged obliquely upon their supporting-heads and that the said heads may be readily turned upon their shaft, so as to bring them out of cutting position when so desired.

In Fig. 7 two sets of the stationary knives, two sets of the movable knives, and a single intermediate presser-frame are shown, and the parts are all similar to those heretofore described, except as to the duplicate construction. By this means the slicing or cutting operation can be carried on at both sides of the presser-frame and thereby increase the efficiency of the device.

Having thus fully described my invention, what I claim, and desire to secure by Letters Patent, is—

1. In a fruit and vegetable cutter, the combination with a frame consisting of parallel sides; of a series of fixed curved knives secured within the frame, and arranged to present a convex cutting-surface; a pivoted presser-bar having a concave face coöperating with the knives; and a semicircular frame carrying knives and mounted upon a shaft in rear of the said fixed knives, and a connection between the presser-bar and said semicircular frame whereby the latter is operated by the movement of the presser-bar.

2. In a fruit or vegetable cutter, the combination with the supporting-frame consisting of parallel sides connected by transverse bolts; a fixed convex cutting-frame consisting of curved knives connected by transverse knives; a presser-bar having a concave face and a handle; a supplemental cutting-frame pivotally supported in rear of the fixed cutting-frame; and a connection between said supplemental frame, and the presser-bar.

3. In a fruit and vegetable cutter, the combination with the supporting-frame, and fixed cutting-knives; of the concaved presser-bar having a handle for operating the same; an oscillating frame carrying knives, supported in the rear of the fixed knives; a lever for operating said oscillating frame; and a pin or projection carried by the presser-bar and operative within a slot in said lever, whereby said lever is reciprocated by the presser-bar and the oscillating frame automatically operated.

In testimony whereof I affix my signature in presence of two witnesses.

JOSEPH BLONDE.

Witnesses:
   CHAS. H. SABIN,
   JOHN RANSOM.